United States Patent [19]

Weaver et al.

[11] Patent Number: 4,663,177

[45] Date of Patent: May 5, 1987

[54] SUGAR-FREE PUDDING COMPOSITION AND DRY MIX FOR PREPARATION THEREOF

[75] Inventors: Ronald C. Weaver, Oak Ridge; Wayne L. Steensen, Rockaway, both of N.J.

[73] Assignee: Nabisco Brands, Parsippany, N.J.

[21] Appl. No.: 788,420

[22] Filed: Oct. 17, 1985

[51] Int. Cl.⁴ ............................................. A23L 1/187
[52] U.S. Cl. ................................... 426/579; 426/804; 426/548
[58] Field of Search ................ 426/579, 806, 658, 548

[56] References Cited

U.S. PATENT DOCUMENTS

| | | | |
|---|---|---|---|
| 2,607,692 | 8/1952 | Kennedy et al. | 426/579 |
| 2,801,924 | 8/1957 | Clausi | 426/579 |
| 2,829,978 | 4/1958 | Castagna et al. | 426/579 |
| 2,865,762 | 12/1958 | Neukom | 426/579 |
| 2,927,861 | 3/1960 | Charie et al. | 426/579 |
| 2,949,366 | 8/1960 | Hunter et al. | 426/579 |
| 3,231,391 | 1/1966 | Breivik et al. | 426/579 |
| 3,332,785 | 7/1967 | Kuchinke et al. | 426/578 |
| 3,619,208 | 11/1971 | Bahoshy et al. | 426/579 |
| 3,642,491 | 2/1972 | Schlatter | 426/548 |
| 3,754,935 | 8/1973 | Glicksman et al. | 426/579 |
| 3,934,049 | 1/1976 | Lauck | 426/573 |
| 3,955,009 | 5/1976 | Eskritt et al. | 426/578 |
| 4,006,262 | 2/1977 | Smith et al. | 426/579 |
| 4,192,900 | 3/1980 | Cheng | 426/579 |
| 4,395,429 | 7/1983 | Campagne et al. | 426/579 |

*Primary Examiner*—Jeanette Hunter
*Attorney, Agent, or Firm*—Richard Kornutik

[57] ABSTRACT

A sugar-free instant-type pudding and a hydratable dry mix for preparation thereof, the essential ingredients of which are a pregelatinized thickening starch, a non-sugar bulking/dispersing agent, phosphate gelling agents, a non-sugar sweetening agent and small but effective amounts of both carrageenan and an alginate to provide a texture and setting properties in the pudding which closely approximate those of sugar-containing instant puddings and, in turn, traditional cooked-starch puddings.

14 Claims, No Drawings

SUGAR-FREE PUDDING COMPOSITION AND DRY MIX FOR PREPARATION THEREOF

BACKGROUND OF THE INVENTION

The present invention relates to pudding compositions, and particularly to sugar-free pudding compositions and hydratable dry mixes for preparation thereof.

In traditional cooked-starch puddings, a mixture of starch, sugar, liquid medium and various flavoring ingredients is heated at boiling temperature for a time sufficient for the starch granules to undergo progressively increasing stages of water absorption, swelling and loss of birefringence, along with leaching out of soluble portions of the starch. The aqueous mixture increases greatly in viscosity and, upon cooling, sets to a gelatinous structure having an organoleptically-acceptable firm yet smooth, creamy texture.

To accommodate consumer demand for convenience products, food processors developed compositions which are now commonly referred to as instant puddings. In these products, a packaged sugar and starch containing dry mix is provided which can be hydrated by the consumer with water or milk without need for cooking, and then refrigerated to produce a set or gelled pudding. In order to provide the viscous and smooth texture found in the counterpart traditional cooked-starch puddings, these instant pudding mixes generally contain starch in pregelatinized form, i.e., a form which provides thickening upon hydration without need for cooking. To provide the gelled or set texture achieved in the traditional cooked product, the art has generally relied upon phosphate gelling agents which act by coagulating milk proteins (provided in the mix or through use of milk as the hydrating medium). See, for example, U.S. Pat. Nos. 2,607,692 to Kennedy, et al.; 2,801,924 to Clausi; 2,829,978 to Castagna, et al.; and 2,927,861 to Charie, et al. More recently, certain starches having gelling properties have been employed to form instant puddings or pie fillings without need for an independent gelation system. See, e.g., U.S. Pat. Nos. 4,518,622 to Wilson, et al. and 4,465,702 to Eastmen, et al.

In the years since original development of instant pudding mixes, considerable formula optimization and refinement has been undertaken such that the pudding products made therefrom now are considered by consumers to provide textural and eating characteristics which are a quite good approximation of the characteristics of traditional cooked-starch puddings.

A more recent trend in consumer preference is for products which are of low caloric content, and in particular sugar (saccharide)-free products. The art is well aware of a variety of non-sugar sweeteners which can be substituted for sugar to provide equivalent or near-equivalent sweetening characteristics in various products, such as the dipeptide sweeteners (e.g., aspartame), saccharin, cyclamate, Acesulfame-K and the like. However, due to the extreme sweetness potency of these sugar substitutes, ranging anywhere from 100 to 300 or more times as sweet as sugar (sucrose), simple replacement of sugar in product formulations with a sweetness equivalent amount of these substitutes often involves elimination of a considerable portion of the sugar-sweetened product.

For instant pudding mixes, replacement of sugar with a sweetness equivalent amount of a high intensity sweetener such as those noted above will involve elimination of from about 35 to 75% by weight of the dry mix. Not only does this result in considerable loss of solids per se from the hydrated pudding product, but, as described in further detail hereinafter, has significant effects on the processability of the dry mix and the functional characteristics of the pudding. The art almost casually assumes that it is sufficient to just include in the mix a suitable non-sugar "bulking agent" to make up for solids and bulk lost by sugar elimination. However, the adverse effect of sugar elimination on mix and final product characteristics, particularly in products such as instant pudding compositions which are required to simulate particular textural and eating characteristics associated with traditional products, has been found to require additional and more particular modifications.

Yet another difficulty involved with providing a sugar-free counterpart of an instant pudding product is that it generally is desirable that low-fat and/or skim milk be employable as the hydrating medium for the dry mix so as to provide the consumer with a final product which not only is sugar-free but which also is of the lowest possible caloric value. The elimination from the final pudding product of the fat provided by the conventional whole milk hydrating medium has significant adverse effect on the desired setting and textural characteristics of the pudding.

SUMMARY OF THE INVENTION

In accordance with the present invention, an instant, sugar-free pudding product is provided, as well as a hydratable dry mix for preparation thereof, which exhibits processing and textural characteristics closely similar to those exhibited by sugar-containing counterpart products (and, in turn, the desirable eating and textural attributes of traditional cooked-starch puddings). The dry mix is particularly adapted to provide a product having these characteristics even when low-fat and/or skim milk is used as the hydrating medium.

The dry mix according to the invention comprises pregelatinized starch, a non-sugar bulking and dispersing agent, a non-sugar sweetening agent, phosphate gelling agents and, to provide the required setting and textural characteristics, effective amounts of a carrageenan and an alginate.

The dry mix is adapted to be hydrated in a liquid medium, such as whole milk or, most preferably, low-fat milk or skim milk, to provide a pudding composition which is sugar-free yet which has functional, textural and eating characteristics similar to sugar containing instant and traditional cooked-starch products. In terms of the hydrated pudding, the composition will comprise from about 1 to 5% by weight pregelatinized starch, and from about 0.05 to about 0.5% by weight of each of the carrageenan and alginate. The non-sugar sweetening agent will be present in the amount required to provide overall sweetness in the pudding equivalent to that of a sugar-sweetened counterpart, and generally will be on the order of from about 0.02 to about 0.5% by weight of the hydrated pudding. Non-sugar bulking/-dispersing agent generally can be present in the hydrated pudding over a fairly wide range, typically from about 2 to about 10% by weight.

The most substantial proportion of the hydrated pudding will be the hydrating medium itself. The preferred medium will be a skim or low-fat milk so as to augment the low-calorie nature of the product, but whole milk also may be employed. These media will provide the milk proteins for interaction with the phosphate gelling agents. Water also can be employed as the hydrating medium, in which case the dry mix will be formulated to contain the required milk proteins, such as in the form of dried milk solids, dried non-fat milk solids, sodium caseinate or the like. A particularly important feature of the invention is the provision of sugar-free pudding product of low calorie content, using a low-fat hydrating medium (e.g., skim or low-fat milk), which nevertheless possesses textural and setting characteristics closely similar to those exhibited by a product prepared using whole milk as the hydrating medium.

The desired firm yet smooth texture in the final hydrated pudding product is attained through a unique combination of pregelatinized starch, phosphate gelling agents (and milk proteins for interaction therewith) and the carrageenan and alginate. In sugar-containing instant puddings, the sugar plays a not fully understood role in helping to achieve proper set of the pudding, proper interaction among thickening and setting components, and formation of a gelatinous network which is resistant to weeping or syneresis yet not too firm or pasty. According to the invention, it is found that this role of sugar is not adequately simulated or attained through mere substitution of non-sugar sweetening agent and non-sugar bulking agent. However, further inclusion of relatively small amounts of the specific carrageenan/alginate combination has been found to provide the requisite texture and gel characteristics in a sugar-free pudding product. This same formulation modification permits use of low-fat and/or skim milk to be used as the hydrating medium.

PRIOR ART

The use of gums or hydrocolloids in pudding products has been discussed in a number of prior art patents. In the earlier-noted U.S. Pat. No. 2,801,924 to Clausi, it is suggested that a "stiffening agent" be employed along with the phosphate/milk protein gels of his invention. The stiffening agents include starch and starch derivatives, natural gums and modifications thereof, cellulose derivatives and the like, with pregelatinized starch "by far the most preferred". According to the patent, these materials are characterized by being capable of increasing the viscosity of water and other aqueous systems and appear to act in pudding preparation in this manner. In U.S. Pat. No. 2,865,762 to Neukom, a dry mix for preparing an instant pudding by hydration in cold milk is disclosed containing sodium starch phosphate, tetrasodium phosphate, sugar and Irish moss extract. U.S. Pat. No. 2,949,366 to Hunter, et al. discloses a pudding-like product prepared by adding to cold water a composition comprised of a milk-soluble alginate, a phosphate gelling or sequestering agent, an acidic ingredient and a milk solid. Both sugar-containing and artificially-sweetened compositions are disclosed. In U.S. Pat. No. 3,231,391 to Breivik, et al., an instant pudding mix is disclosed containing sugar, pregelatinized starch, phosphate gelling agents and an acetylated monoglyceride of a higher fatty acid to reduce foaming upon admixture and whipping of the composition with milk. Hydrophilic lipin emulsifiers may be used to replace some of the acetylated monoglyceride. According to the patent, although pregelatinized starch is preferred as the gel stiffening agent, other alternative thickeners can be employed such as starch derivatives, natural gums and modifications thereof, hydrophilic colloids from sea plants, cellulose derivatives and the like. Examples of the natural gums are guar gum and locust bean gum and examples of the hydrophilic colloids derived from sea plants are the alginates and carrageenans.

In U.S. Pat. No. 3,332,785 to Kuchinke, et al., it is stated that shape-retaining puddings or custards can be made by water or milk hydration of cold-swellable starches and that shape-retention can be improved by addition of thickening and water-binding agents such as alginates, gelatins or phosphates. In U.S. Pat. No. 3,619,208 to Bahoshy, et al., instant pudding compositions are discussed which are based on milk coagulating agents and thickening agents such as starches, gums, hydrocolloids and the like to provide additional firmness and texture to the pudding. Cooked pudding mixes also are disclosed containing raw starch, modified starch and sugar. Colloids or gums such as carrageenan or algin are optionally employed for providing additional firmness in the pudding. It is stated that non-nutritive sweetening agents such as cyclamates, saccharins and the like may be employed to replace all or part of the sugars, and the use of non-sweetening carbohydrate bulking agents also is disclosed.

In U.S. Pat. No. 3,642,491 to Schlatter (Example 5), a pudding is prepared from skim milk, algin, phosphate gelling agent and a dipeptide sweetening agent. In U.S. Pat. No. 3,754,935 to Glicksman, et al., a frozen pudding is prepared from chemically unmodified tapioca starch, water, vegetable fat and one or more emulsifying agents. Sweetening agents which may be included in the frozen pudding composition include sucrose, dextrose, fructose, dextrins and similar carbohydrates. According to the patent, low calorie puddings may also be prepared by employing synthetic sweetening agents, preferably in combination with a carbohydrate filler. U.S. Pat. No. 3,934,049 to Lauck describes cold set milk pudding compositions comprised of a combination of various phosphates and a thickener selected from pregelatinized starch, gums, or mixtures thereof. Pregelatinized starch is preferred and among the gum thickeners are acacia, agar agar, alginates, carob bean gum, carrageenin, ghatti gum, guar gum, sterculia gum, tragacanth and the like, and synthetic gums such as carboxymethyl cellulose, carboxyethyl cellulose and the like.

U.S. Pat. No. 3,955,009 to Eskritt, et al. discloses a dry reconstitutable dessert mix for preparation of yoghurt-like desserts comprised of modified and/or pregelatinized starch, edible acid and a hydrocolloid gum such as guar gum. Sucrose is the preferred sugar to be used as a sweetener, but other sugars such as dextrose, corn syrup solids, lactose, etc. are disclosed. According to the patent, artificial sweeteners such as edible saccharin salts, dipeptide salts and the like may be included in the mix to replace all or part of the sugar. In U.S. Pat. No. 4,006,262 to Smith, et al. an instant pudding composition is disclosed containing phosphate gelling agents, thickener and sugar. This thickener or stiffening agent is starch and starch derivatives, natural gums and modifications thereof, cellulose derivatives and the like, with pregelatinized starch being by far the most preferred. Reduced calorie puddings are provided by replacement of part of the sucrose with starch derivatives such as dextrins, which may be bulked, and with sweetening agents or sugar substitutes such as saccharin, Aspartame or the like.

DETAILED DESCRIPTION OF THE INVENTION

The instant pudding mix of the invention is a dry, free-flowing particulate admixture of a number of components. As understood in the art, the term "dry" is used to define a moisture content sufficiently low to insure stability against microbial contamination, prevent moisture-induced caking or lumping of ingredients in the package and prevent premature reaction or interaction among the ingredients. Generally, the moisture content of the mix will be below 6% by weight, and preferably will be below 4% by weight.

The particulate nature of the mix is such as to promote, insofar as possible, free-flowability and rapid dispersibility of ingredients in the hydrating medium. The desired particle size or particle size distribution can be attained by selective blending of ingredients of desired size and/or by grinding or milling of parts or all of the composite mixture of ingredients.

The dry mix contains, as essential ingredients, pregelatinized starch, non-sugar bulking/dispersing agent, non-sugar sweetener, phosphate gelling agents, carrageenan and alginate.

The pregelatinized starch component of the mix can be selected from any one or more food-grade acceptable pregelatinized starches such as pregelatinized tapioca starch, pregelatinized waxy maize starch, pregelatinized corn starch and the like. Typically, the starch component will comprise from about 15 to 35% by weight of the mix (i.e., the dry ingredients of the eventually hydrated pudding). In terms of the final hydrated pudding, the starch component generally will comprise from about 1 to 5% by weight thereof, and preferably from about 2 to 4% thereof.

A preferred starch component for use in the present invention is the pregelatinized starch combination described in U.S. Pat. No. 4,504,512 to Danielson, et al., incorporated herein by reference. Thus, the preferred starch component comprises a first pregelatinized starch, generally present as the major amount of the starch component, which is derived from tapioca starch, waxy maize starch or a mixture thereof, and which independently produces puddings (milk-based; phosphate gelling system) which are of firm, long, elastic, fudgy texture, and a second pregelatinized starch, also derived from either tapioca and/or waxy maize starch, which independently produces milk-based, phosphate gelled puddings which are of short, smooth texture. Other starches may be present as part of this preferred starch component provided they do not adversely affect the balance of creaminess/smoothness and firmness/cutting ability achieved with the principal pregelatinized starches.

The bulking (dispersing) agent employed in the present invention can be, for example, any non-sugar carbohydrate which is capable of providing solids to the hydrated pudding and which promotes dispersibility of the dry mix ingredients when hydrated (thereby replacing an important function of the sugar in sugar-containing mixes). The bulking agent generally will comprise a principal amount (e.g., 15 to 65%) of the dry ingredients of the pudding (preferably about 35 to 60%) and generally from about 2 to 10% by weight of the hydrated pudding, with a preferred range being from 3 to 6% by weight. As a consequence, considerable care should be taken to insure that this component not possess any inherent off-flavors or other attributes which might adversely affect the organoleptic properties of the final pudding product.

Among the preferred bulking agents are maltodextrins of relatively low dextrose equivalent (i.e., DE of less than about 15). These starch conversion products can be employed in conventional spray-dried or in agglomerated bulk form, and are effective in dispersing the dry mix ingredients in the hydrating medium, particularly the starch components, and providing body to the final pudding. Other possible but less preferred classes of bulking agents are modified starches, glucose or dextrose polymers and the like.

The functionality of the bulking agent in promoting as complete as possible intermixing of all dry ingredients and uniform dispersion of such ingredients throughout the hydrating medium will, to a degree not yet fully ascertained, be dependent upon its particle size (or particle size distribution) as a function of particular amounts and types of other ingredients present and the amount and type of bulking agent employed. Generally, a coarse particle size is desirable to provide a degree of abrasion which promotes complete intermixing of the dry ingredients; at the same time, however, too coarse a particle size (or a particle size distribution having too few fine particles) may lead to an inability to hold other dense or finely-divided ingredients in an intermixed relationship within the dry matrix of bulking agent. For these reasons, a preferred particle size distribution for the bulking agent will be up to 10% retained on a 20 mesh screen, 30 to 40% retained on a 60 mesh screen, 25 to 60% retained on a 100 mesh screen, 15 to 25% retained on a 200 mesh screen, and up to 10% on the pan, (i.e. through 200 mesh screen). All percents are by weight, the mesh screens are U.S. Standard Seive screens, and the distribution is determined via conventional Ro-Tap testing apparatus. As noted, the specific or optimum particle size distribution necessary to obtain desired intermixing and dispersibility will vary based upon the amount and types of the particular ingredients in the mix and their inherent particle sizes and densities.

The non-sugar sweetening agent for use in the present invention is preferably a dipeptide sweetener such as aspartame, but may also consist in whole or in part of other sweetening agents such as saccharin and its salts, cyclamates, Acesulfame-K and the like. These potent sweeteners will be employed in the dry mix in an amount which provides to the hydrated pudding an overall degree of sweetness corresponding to that achieved in sugar-containing puddings, with recognition of the fact that these sweetening agents, absent modification, generally will not perfectly mimic the overall sweetness profile of sucrose or other sugars. Typically, the level of non-sugar sweetening agent will be from about 0.02 to about 0.5% by weight of the hydrated pudding, and preferably from about 0.04 to about 0.2% by weight thereof.

The phosphate gelling agents employed in the present invention are those phosphates which react with (coagulate) milk proteins in hydrated media to form a gelled structure. Generally, these agents will comprise a mixture of an alkali metal orthophosphate and an alkali metal pyrophosphate. The alkali metal pyrophosphates include all water-soluble edible alkali metal pyrophosphates, with the di- and tetra- sodium and potassium pyrophosphates being preferred. The water-soluble edible orthophosphates preferably are the di- and tri-sodium and potassium salts.

The phosphate gelling agents will be employed in amounts balanced to the amount of coagulable milk protein present in the final pudding (from a milk hydrating medium and/or milk solids in the dry mix) and the degree of firmness or set desired. Typically, the phosphate gelling agents will be present in the dry mix in an amount to provide from about 0.5 to about 1.5% thereof in the hydrated pudding, and more typically from about 0.7 to about 1.2% by weight of the pudding.

The phosphate-based gelling system may also be augmented with additional ingredients to assist in and/or control setting properties or rates. Preferred in this regard is use of the soluble calcium salts described in the earlier-mentioned U.S. Pat. No. 4,504,512 to Danielson, et al. for controlling the rate of gel formation.

The combined structural and textural effects of milk gel formation by means of the phosphate gelling agents and thickening by means of the pregelatinized starch component are further combined in the present invention with texture-imparting and structure-stabilizing effects contributed by the unique combination of small amounts of carrageenan and alginate. The need for utilization of these hydrocolloids is occasioned as a consequence of removal of sugar from a typical sugar-containing instant pudding formulation and the desire to provide a product hydratable with (or based upon) a low-fat hydrating medium, since the sugar-containing, whole milk-hydratable products produce highly acceptable texture and stability without need for hydrocolloids. The inter-relationship between absence of sugar and fat and the inability to achieve the requisite texture and structural stability in the phosphate-based and starch-thickened instant puddings to which the invention pertains is not completely understood save for the fact that the inability is not cured by mere replacement of sugar with non-sugar sweetening agent and non-sugar bulking agent. Absent the addition of the unique hydrocolloid blend of the invention, sugar-free instant puddings, and particularly those formulated to be of low-fat content, are prone to syneresis and lack the desired smooth yet firm pudding texture, perhaps due to absence of some form of protective effect of sugar or fat on the starch component, or absence of some ability of sugar or fat to prevent thickened starch gels from releasing their bound liquid, or absence of some ability of sugar or fat to enhance absorptivity of the starch, or more complex interaction among starch and milk protein coagulation.

According to the invention, each of the carrageenan and alginate are employed in the dry mix in an amount which will provide from about 0.05 to 0.5% of each by weight in the final hydrated pudding, and preferably from about 0.07 to about 0.2% by weight thereof. The carrageenan preferably is wholly or predominantly in the form of kappa-carrageenan, and the alginate is in the form of an alkali metal salt thereof, preferably the sodium salt. Advantageously, the carrageenan and alginate are added to the dry mix ingredients in intimate association or combination with a suitable non-sugar carrier therefor (which may, for example, be a portion of the bulking/dispersing agent ingredient of the pudding mix) in order to promote their dispersibility in the hydrating medium. The individual hydrocolloids may be combined in a separate step prior to admixture with remaining ingredients of the dry mix.

Apart from the foregoing essential ingredients of the pudding mix and pudding of the invention, the formulation may also include additional ingredients. It is, of course, conventional to include suitable flavorants and colorants in the mix so as to provide puddings of particular flavor types (chocolate, butterscotch, vanilla). In the present invention, as earlier noted, the instant pudding dry mix is formulated so as to be functional via hydration in water (provided milk solids are included in sufficient quantity in the dry mix), whole milk, low-fat milk, skim milk or the like. With respect to utilization of low-fat or skim milk as the hydrating medium, it has been found desirable to include in the dry mix formulation a small amount of an opacifying agent such as titanium dioxide (e.g., at levels to provide from about 0.05 to about 0.5% by weight of the final hydrated pudding, and most preferably from about 0.9 to about 0.15% by weight thereof) to insure that irrespective of the hydrating medium employed, a close simulation of a whole milk-based system is obtained.

The dry mix of the present invention also advantageously will include one or more emulsifiers to assist in obtaining of the desired creamy and smooth texture and to promote rapid and complete dispersion of the dry mix composition in the hydrating medium. A variety of emulsifiers may be employed, but particularly preferred is the mixture of mono- and di- glycerides described in U.S. Pat. No. 4,504,512 to Danielson, et al. As also described in Danielson, et al., the emulsifier component preferably is included in the dry mix in the form of a pre-blend of emulsifier, an edible oil, a portion of the starch from the dry mix and a portion of the sugar (here, bulking or dispersing agent) of the dry mix. The emulsifier generally will be present in the dry mix of the invention in an amount sufficient to provide in the final hydrated pudding from about 0.01 to about 0.2% emulsifier by weight, and most preferably from about 0.03 to about 0.1% by weight The invention is further illustrated in the following examples.

EXAMPLE I

A dry mix for preparation of a sugar-free chocolate pudding can be formulated from the following ingredients within the dry mix weight percents set forth:

Maltodextrin, DE 9-12: 26-40
Emulsifier preblend[3]: 12-25
Dutched cocoa: 12-18
Modified food starch[1]: 12-18
Disodium orthophosphate: 3-5
Tetrasodium pyrophosphate: 2-4
Modified food starch[2]: 1.8-3.0
Hydrocolloid blend[4]: 1.8-3.0
Titanium dioxide: 0.7-1.4
Aspartame: 0.4-1.2
Calcium sulfate: 0.4-1.2
NFDM solids: 0.2-1.0
Colors, flavors: balance 1—H50BN (National Starch Company);
2—447 (A. E. Staley & Co.);
3—The blend contains 55-65% maltodextrin, 25-35% H50BN starch, 2 to 5% mono- and di-glyceride, emulsifier, 0.5 to 2.0% vegetable oil and balance antioxidants;
4—The blend contains 2 to 15% maltodextrin, 35-50% kappa-carrageenan and 35-50% sodium alginate.

The ingredients (approximately 60 grams) are mixed with 16 ounces of skim milk at a temperature of about 10° C. and stirred using a kitchen mixer for about 1 to 2 minutes. Thereafter the hydrated mix is refrigerated for thirty minutes to one hour, at which point it is ready for consumption.

EXAMPLE II

A dry mix for preparation of a sugar-free vanilla pudding can be formulated from the following ingredients within the dry mix weight percents set forth:

Maltodextrin, DE 9-12: 30-50
Emulsifier Blend [3]: 14-24
Modified Food Starch [1]: 14-20

Tetrasodium pyrophosphate: 3.5–6.5
Disodium orthophosphate: 2.8–4.5
Modified food starch[2]: 2.0–4.0
Hydrocolloid blend[4]: 1.8–3.2
Titanium dioxide: 0.7–1.4
Aspartame: 0.4–1.2
Calcium sulfate: 0.4–1.2
Flavors, colors: balance (1, 2, 3, 4 as per Example I)

Fifty grams of the above dry mix are mixed with 16 ounces of skim milk according to Example I to provide the final pudding product.

The above description has been for the purpose of illustrating and explaining the invention to those skilled in the art, and is no intended to describe all obvious modifications and variations of it which will be apparent upon reading and which are embraced by the spirit and scope of the invention as defined in the appended claims.

What is claimed is:

1. A sugar-free pudding mix adapted to produce an edible, sugar-free pudding upon admixture with an aqueous hydrating medium, comprising a dry, particulate, free-flowing mixture of pregelatinized starch in an amount sufficient to provide from about 1% to about 5% by weight thereof in the hydrated sugar-free pudding, non-sugar bulking and dispersing agent, non-sugar sweetening agent, phosphate gelling agents capable of interacting with and coagulating milk protein in a hydrated medium, carrageenan and an alginate, said carrageenan and alginate being present in said dry mix in an amount sufficient to provide from about 0.05 to about 0.5% by weight of each, based upon the weight of the hydrated sugar-free pudding.

2. A sugar-free dry mix according to claim 1 wherein said non-sugar sweetening agent is aspartame.

3. A sugar-free dry mix according to claim 2 wherein said aspartame is present in the dry mix in an amount sufficient to provide from about 0.02 to about 0.5% by weight thereof in the hydrated sugar-free pudding.

4. A sugar-free dry mix according to claim 1 wherein said phosphate gelling agents comprise disodium orthophosphate and tetrasodium pyrophosphate.

5. A sugar-free dry mix according to claim 1 wherein said carrageenan is present predominantly as kappa-carrageenan.

6. A sugar-free dry mix according to claim 1 wherein each of said carrageenan and alginate is present in said dry mix in an amount sufficient to provide from about 0.07 to about 0.2% by weight thereof in the hydrated sugar-free pudding.

7. A sugar-free dry mix according to claim 1 further comprising titanium dioxide in an amount sufficient to provide from about 0.05 to about 0.5% by weight thereof in the hydrated sugar-free pudding.

8. A sugar-free dry mix according to claim 1 further comprising an emulsifier component.

9. A sugar-free dry mix according to claim 8 wherein said emulsifier comprises a mixture of mono- and diglycerides.

10. A sugar-free pudding comprising a hydrated and set admixture of water, milk protein solids, pregelatinized starch in an amount of from about 1 to 5% by weight, non-sugar bulking agent in an amount of from about 2 to 10% by weight, phosphate gelling agents providing coagulation of milk protein in said hydrated admixture, non-sugar sweetening agent in an amount of from about 0.02 to about 0.5% by weight, and carrageenan and an alginate, each present in an amount of from about 0.05 to about 0.5% by weight.

11. A sugar-free pudding according to claim 10 wherein said non-sugar sweetening agent is aspartame.

12. A sugar-free pudding according to claim 10 wherein said phosphate gelling agents comprise disodium orthophosphate and tetrasodium pyrophosphate.

13. A sugar-free pudding according to claim 10 wherein said non-sugar bulking agent comprises a maltodextrin having a dextrose equivalent of from about 9 to 12.

14. A sugar-free pudding prepared by mixing the dry mix of claim 1 with low-fat milk in proportions sufficient to provide in the mixture the indicated amounts of said pregelatinized starch, carrageenan and alginate, and permitting the mixture to set to a firm yet smooth textured mass.

* * * * *